US012639345B2

(12) United States Patent
Singh et al.

(10) Patent No.: US 12,639,345 B2
(45) Date of Patent: May 26, 2026

(54) METHOD AND SYSTEM FOR GENERATING EXECUTIVE SUMMARIES AND DATA VISUALIZATIONS FOR ANNUAL PRODUCT QUALITY REPORTS

(71) Applicant: Honeywell International Inc., Charlotte, NC (US)

(72) Inventors: Ankit Singh, Apex, NC (US); Waad Subber, Schenectady, NY (US); Niranjan Ghule, Mumbai (IN); Shraddha Kelkar, Mumbai (IN)

(73) Assignee: Honeywell International Inc., Charlotte, NC (US)

( * ) Notice: Subject to any disclaimer, the term of this patent is extended or adjusted under 35 U.S.C. 154(b) by 28 days.

(21) Appl. No.: 18/672,000

(22) Filed: May 23, 2024

(65) Prior Publication Data

US 2025/0363139 A1      Nov. 27, 2025

(51) Int. Cl.
*G06F 16/3329* (2025.01)
*G06F 16/242* (2019.01)
*G06Q 10/0639* (2023.01)

(52) U.S. Cl.
CPC ........ *G06F 16/3329* (2019.01); *G06F 16/243* (2019.01); *G06Q 10/06395* (2013.01)

(58) Field of Classification Search
CPC .................................................. G06F 16/3329
See application file for complete search history.

(56) References Cited

U.S. PATENT DOCUMENTS

| | | | | |
|---|---|---|---|---|
| 2007/0016459 A1* | 1/2007 | King | .................... | G06Q 10/087 |
| | | | | 705/28 |
| 2013/0282894 A1* | 10/2013 | Barak | ................... | G06F 16/958 |
| | | | | 709/224 |
| 2018/0121035 A1* | 5/2018 | Filippi | ................. | G06F 40/169 |
| 2024/0330583 A1* | 10/2024 | Ryan | .................... | G06V 10/764 |

* cited by examiner

*Primary Examiner* — Van H Oberly
(74) *Attorney, Agent, or Firm* — Alston & Bird LLP

(57) ABSTRACT

The present disclosure provides a system and method for generating text summary and data visualizations for executive summaries of annual product quality reports based on an input query from a user. The method for generating text summary for annual product quality reports (APQR) of an enterprise, comprising: providing one or more indexes corresponding to one or more categories of data stored in a database, receiving a query from one or more users, wherein the query is a text and based on the at least one of the indexes of the one or more categories of data, extracting one or more relevant textual content from the query using natural language processing, querying the database for retrieving the one or more indexes of the relevant textual content, providing one or more few shot prompts for generating an output in a predetermined format based on the query received from the one or more users, inputting, the one or more few shot prompts and the retrieved one or more indexes to a large language model (LLM), generating a text summary based on the input to the LLM and rendering the generated text summary at a user device.

20 Claims, 15 Drawing Sheets

100

Enterprise document

Enterprise document broken down into smaller documents based on product, chapter content etc.

Smaller documents stored in vector database

350

User Input      API Call      Application program interface (API)      Retrieve relevant documents

314

316

318

Generate expected outcome      Extract executive summary and feed to few shot prompt input Container and closure system quality standard:

| Description: | Document ID | Document Type | Revision No. | Effective Date: | Change Control: | Changed: |
|---|---|---|---|---|---|---|
| Methocarbamol 500 mg, 750mg Tablets 10 count: 50cc. White, round HDPE Bottle with 33-400mm CRC Cap with selig SG75M Liner | PCS6000020 | Bottle Specification | 01 | 11/13/2020 | CC1020025 | Yes |
| | PCM6000020 | Bottle Method | 01 | 11/13/2020 | CC1020025 | Yes |
| | PCS6500005 | Cap Specification | 02 | 8/28/2020 | CC0820016 | Yes |
| | PCM6500005 | Cap Method | 02 | 8/28/2020 | CC0820016 | Yes |
| Methocarbamol 500mg, Tablets 100 count: 120cc. White, round, HDPE Bottle with 38-400mm CRC Cap with selig SG75M Liner | PCS6000003 | Bottle Specification | 02 | 9/17/2020 | CC0920003 | Yes |
| | PCM6000003 | Bottle Method | 01 | 9/17/2020 | CC0920003 | Yes |
| | PCS6500006 | Cap Specification | 03 | 8/28/2020 | CC0820016 | Yes |
| | PCM6500006 | Cap Method | 03 | 11/25/2020 | CC1120015 | Yes |
| Methocarbamol 750mg, Tablets 90,and100 count: 200cc. White, round, HDPE Bottle with 45-400mm CRC Cap with selig SG75M Liner | PCS6000004 | Bottle Specification | 02 | 9/17/2020 | CC0920003 | Yes |
| | PCM6000004 | Bottle Method | 01 | 9/17/2020 | CC0920003 | Yes |
| | PCS6500011 | Cap Specification | 01 | 9/17/2020 | CC0920004 | Yes |
| | PCM6500011 | Cap Method | 02 | 11/25/2020 | CC0110015 | Yes |
| Methocarbamol 500mg, Tablets | PCS65000001 | Bottle Specification | 01 | 8/19/2020 | CC0720034 | Yes |

FIG.8

January 29,2020 to January 28,2021 – Annual Product Review
Methocarbamol Tablets,USP 500mg,and 750mg

900

Raw Material Quality Standards:

| Description: | Item Number | Document Type | Revision No. | Effective Date: | Change Control: | Changed: |
|---|---|---|---|---|---|---|
| Methocarbamol,USP | 1500022 | Test Method | 00 | 02/13/2019 | NA | No |
| | | Certificate of Analysis | 00 | 11/02/2018 | NA | No |
| | | Specifcation | 00 | 11/02/2018 | NA | No |
| Pregelatinized Com Starch,NF | 2000015 | Test Method | 00 | 01/28/2019 | NA | No |
| | | Certificate of Analysis | 00 | 01/28/2019 | NA | No |
| | | Test Method | 00 | 01/28/2019 | NA | No |
| Sodium Starch Glycolate, NF | 2000026 | Specifcation | 00 | 02/25/2019 | NA | No |
| | | Certificate of Analysis | 01 | 11/25/2019 | NA | No |
| | | Specifcation | 01 | 11/25/2019 | NA | No |
| Primojel Sodium Starch Glycolate | 2000056 | Test Method | 00 | 03/10/2020 | CC0320003 | Yes |
| | | Certificate of Analysis | 00 | 03/10/2020 | CC0320003 | Yes |
| | | Specifcation | 00 | 03/10/2020 | CC0320003 | Yes |
| Colloidal Silicon Dioxide, NF | 2000028 | Test Method | 01 | 01/10/2020 | NA | No |
| | | Certificate of Analysis | 01 | 01/10/2020 | NA | No |
| | | Specifcation | 01 | 01/10/2020 | NA | No |
| Povidone, USP(K-90) | 2000052 | Test Method | 00 | 02/25/2019 | NA | No |
| | | Certificate of Analysis | 00 | 01/28/2019 | NA | No |
| | | Specifcation | 00 | 01/28/2019 | NA | No |
| Stearic Acid,NF | 2000020 | Test Method | 00 | 02/25/2019 | NA | No |

FIG.9

1000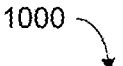

January 29,2020 to January 28,2021 – Annual Product Review
Methocarbamol Tablets, USP 500mg, and 750mg

4. Change Control/Regulatory Activities

~~Twenty(20) requests involving Methocarbamol 500mg,and 750mg Tablets production were generated during the review period. Eighteen (18)change controls were successfully completed. Those that are still in progress will be addressed during the subsequent review periods(s). The change controls listed here are Methocarbamol 500mg,and 750mg Tablet drug products.~~

4.1. Master Formula

4.1.1   CC0720012: The commercial Methocarbamol weigh and blend BPR is revised to Revision 02 for product code 300004,batchsize 500.003kg. The commercial weigh code/strenghs 611/500mg,respectively.

4.1.2.   CC1020029: The commercial Methocarbmol weigh and blend BPR is revised to Revision 03 for product code 3000004,batch size 500.003kg.

4.2. Manufacturing Equipment

FIG.10

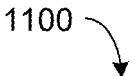
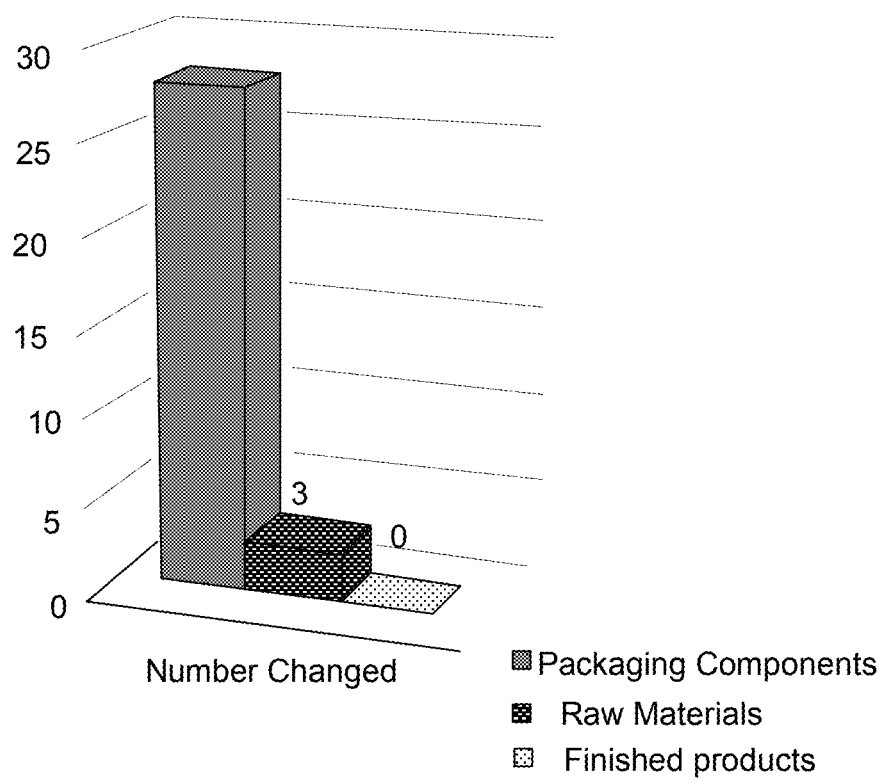
FIG.11A

Figure 11B:
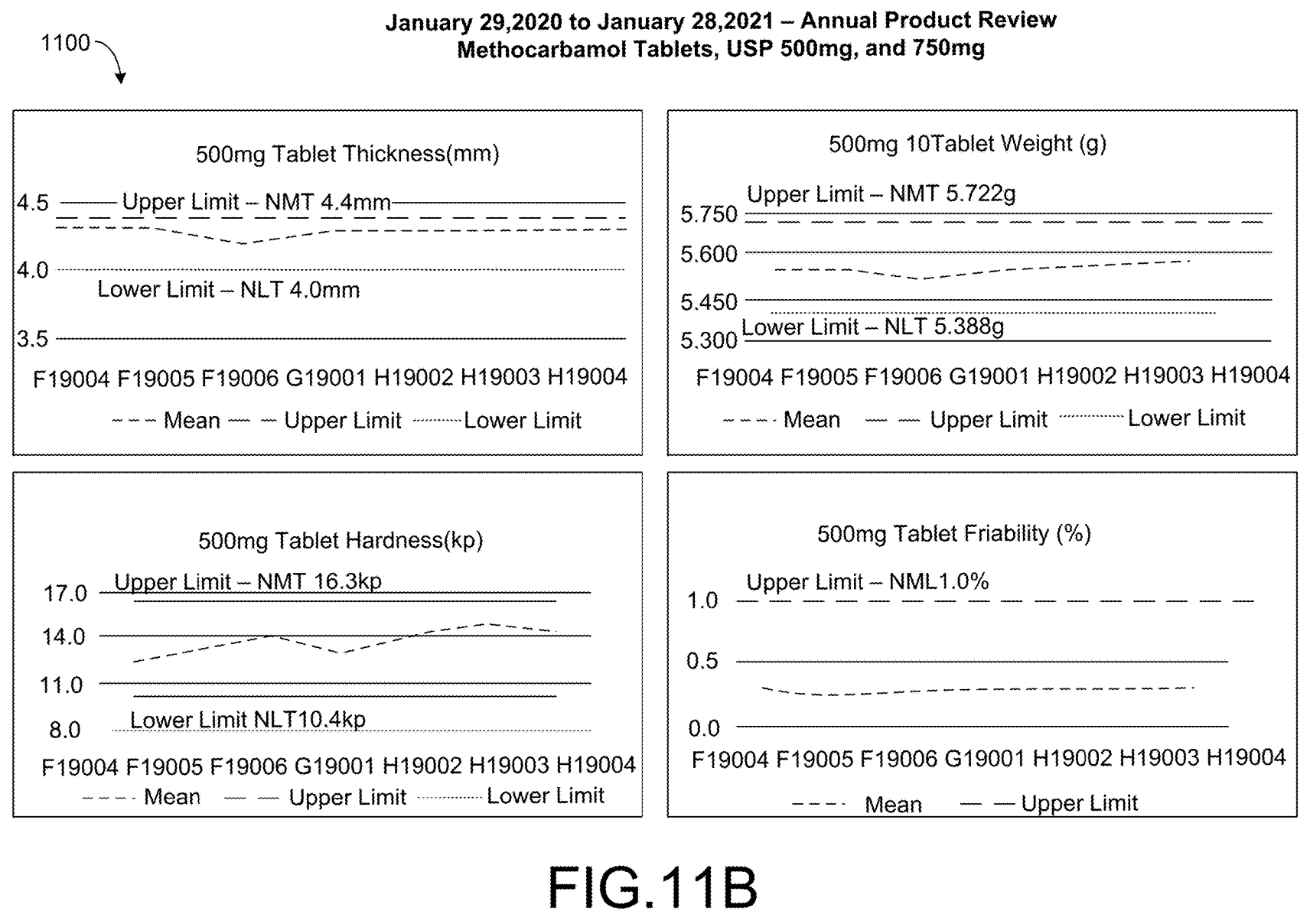

January 29,2020 to January 28,2021 – Annual Product Review
Methocarbamol Tablets, USP 500mg, and 750mg

1100

500mg Tablet Thickness(mm)

4.5   Upper Limit – NMT 4.4mm 4.0   Lower Limit – NLT 4.0mm 3.5

F19004 F19005 F19006 G19001 H19002 H19003 H19004

--- Mean   — Upper Limit   ······· Lower Limit

500mg 10Tablet Weight (g)

5.750   Upper Limit – NMT 5.722g 5.600

5.450   Lower Limit – NLT 5.388g 5.300

F19004 F19005 F19006 G19001 H19002 H19003 H19004

--- Mean   — Upper Limit   ······· Lower Limit

500mg Tablet Hardness(kp)

17.0   Upper Limit – NMT 16.3kp 14.0

11.0   Lower Limit NLT10.4kp 8.0

F19004 F19005 F19006 G19001 H19002 H19003 H19004

--- Mean   — Upper Limit   ······· Lower Limit

500mg Tablet Friability (%)

1.0   Upper Limit – NML1.0%

0.5

0.0

F19004 F19005 F19006 G19001 H19002 H19003 H19004

--- Mean   — Upper Limit

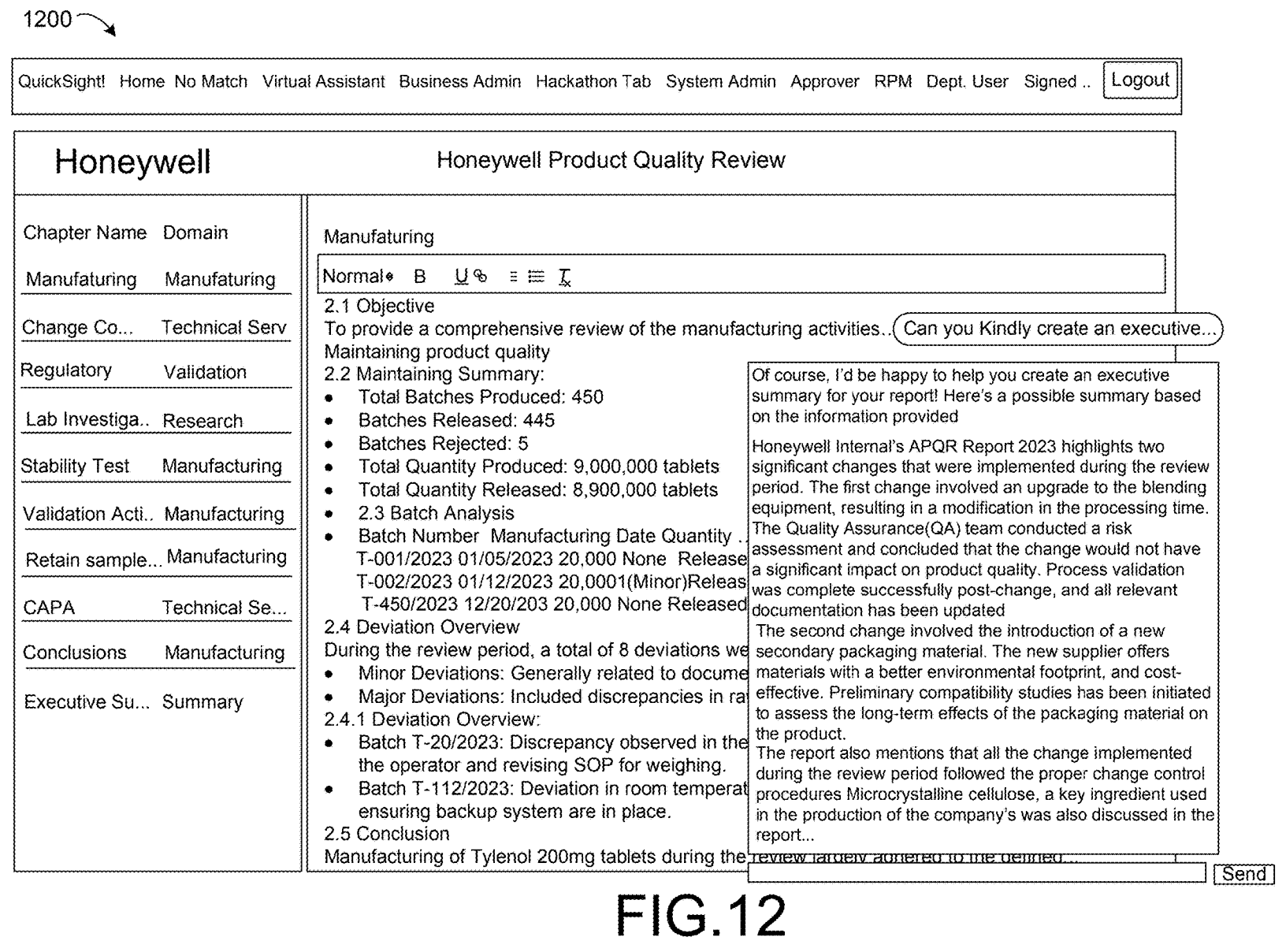

QuickSight! Home No Match Virtual Assistant Business Admin Hackathon Tab System Admin Approver RPM Dept. User Signed .. | Logout |

Honeywell

Honeywell Product Quality Review

| Chapter Name | Domain |
|---|---|
| Manufaturing | Manufaturing |
| Change Co... | Technical Serv |
| Regulatory | Validation |
| Lab Investiga.. | Research |
| Stability Test | Manufacturing |
| Validation Acti.. | Manufacturing |
| Retain sample... | Manufacturing |
| CAPA | Technical Se... |
| Conclusions | Manufacturing |
| Executive Su... | Summary |

Manufaturing

Normal◆  B  U ℗  ☰ ☰ T 2.1 Objective
To provide a comprehensive review of the manufacturing activities...
Maintaining product quality
2.2 Maintaining Summary:
• Total Batches Produced: 450
• Batches Released: 445
• Batches Rejected: 5
• Total Quantity Produced: 9,000,000 tablets
• Total Quantity Released: 8,900,000 tablets
2.3 Batch Analysis
• Batch Number Manufacturing Date Quantity ..
T-001/2023 01/05/2023 20,000 None  Release
T-002/2023 01/12/2023 20,0001(Minor)Releas
T-450/2023 12/20/203 20,000 None Released
2.4 Deviation Overview
During the review period, a total of 8 deviations we
• Minor Deviations: Generally related to docume
• Major Deviations: Included discrepancies in ra
2.4.1 Deviation Overview:
• Batch T-20/2023: Discrepancy observed in the
the operator and revising SOP for weighing.
• Batch T-112/2023: Deviation in room temperat
ensuring backup system are in place.
2.5 Conclusion
Manufacturing of Tylenol 200mg tablets during the Can you Kindly create an executive...

Of course, I'd be happy to help you create an executive summary for your report! Here's a possible summary based on the information provided Honeywell Internal's APQR Report 2023 highlights two significant changes that were implemented during the review period. The first change involved an upgrade to the blending equipment, resulting in a modification in the processing time. The Quality Assurance(QA) team conducted a risk assessment and concluded that the change would not have a significant impact on product quality. Process validation was complete successfully post-change, and all relevant documentation has been updated
The second change involved the introduction of a new secondary packaging material. The new supplier offers materials with a better environmental footprint, and cost-effective. Preliminary compatibility studies has been initiated to assess the long-term effects of the packaging material on the product.
The report also mentions that all the change implemented during the review period followed the proper change control procedures Microcrystalline cellulose, a key ingredient used in the production of the company's was also discussed in the report...

| Send |

FIG.12

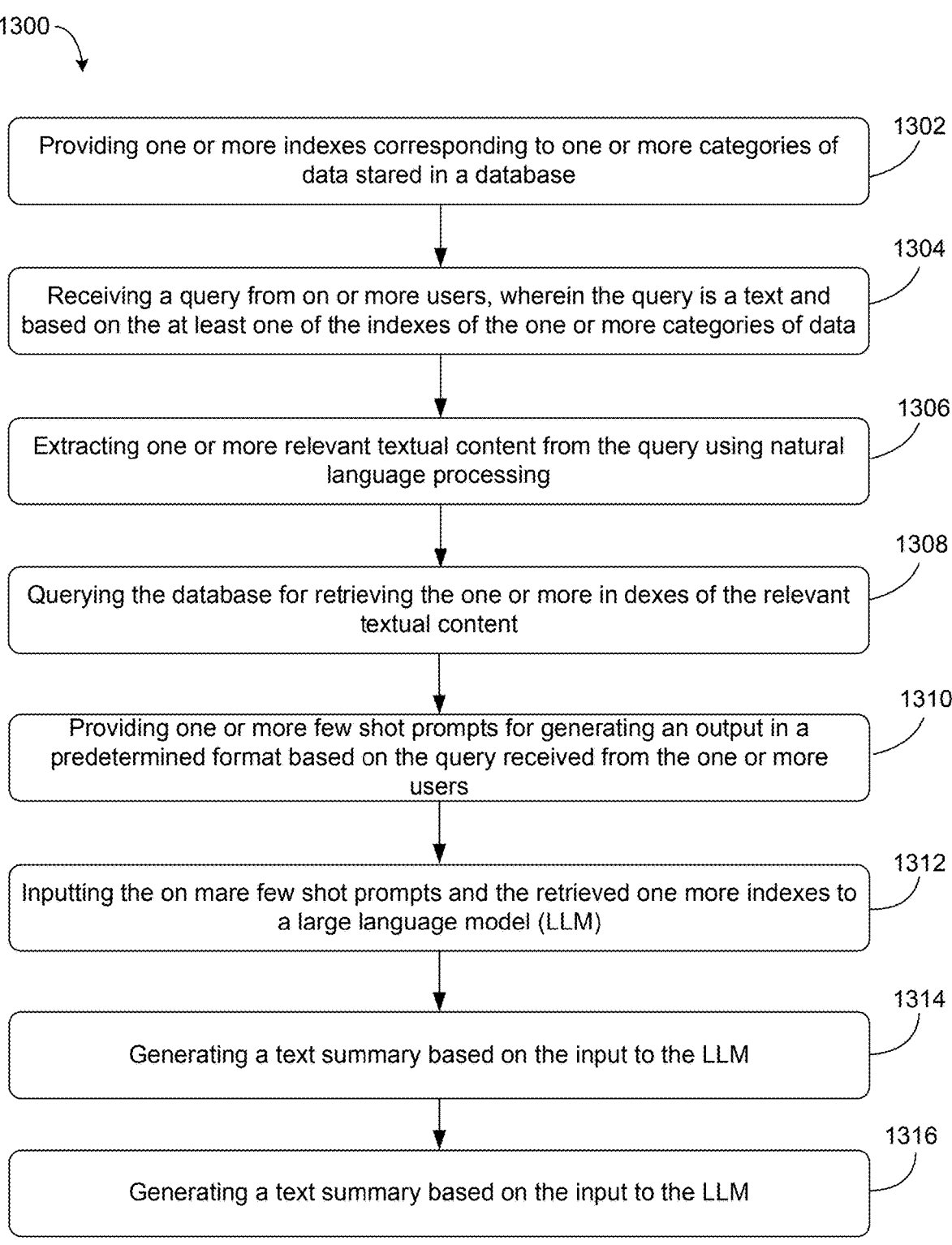

1300

1302
Providing one or more indexes corresponding to one or more categories of data stared in a database 1304
Receiving a query from on or more users, wherein the query is a text and based on the at least one of the indexes of the one or more categories of data 1306
Extracting one or more relevant textual content from the query using natural language processing 1308
Querying the database for retrieving the one or more in dexes of the relevant textual content 1310
Providing one or more few shot prompts for generating an output in a predetermined format based on the query received from the one or more users 1312
Inputting the on mare few shot prompts and the retrieved one more indexes to a large language model (LLM)

1314
Generating a text summary based on the input to the LLM

1316
Generating a text summary based on the input to the LLM

FIG.13

METHOD AND SYSTEM FOR GENERATING EXECUTIVE SUMMARIES AND DATA VISUALIZATIONS FOR ANNUAL PRODUCT QUALITY REPORTS

FIELD OF THE INVENTION

The present disclosure generally relates to prompt engineering and particularly to a system and method for generating text summary and data visualizations for executive summaries of annual product quality reports for business enterprises.

BACKGROUND

Product quality reports are significant for enterprises in order to comply with good manufacturing practice regulations and to maintain high quality products and for regulatory compliance.

Product quality reports consists of multiple chapters assigned to respective department users, (e.g. manufacturing, change control, regulatory, lab investigations, stability tests etc.) that are manually analyzed by the department users before completion of the chapters. Each department user is required to refer to multiple data tables, graphs and other data visualizations to perform a manual chapter analysis based on an input query. For example, a manufacturing department user is required to manually analyze multiple data of the manufacturing activities of a particular drug for completion of the manufacturing chapter content. Once chapters are manually analyzed and marked complete by all the department users, a project review manager manually records an executive text summary by reading through the contents of various chapters analyzed by department users.

The manual analysis of various chapters by the respective department users is time-consuming and are prone to errors as data aggregation is carried out from different cross functional database systems. There is also a lack of coordination between several departments across different groups like R&D, quality assurance, manufacturing and supply chain, commercialization etc. The manually recorded reports are required to be manually correlated with the previous years' reports to create a similar looking content. If there are errors in report, it directly affects the product quality decisions and hinders the process of error correction.

Conventionally, the chapter contents of the annual product quality reports (APQR) are thus manually analyzed by respective department users and the executive summaries are manually recorded by the project review manager after reviewing the various chapter contents of the APQR.

Thus, there is a need for a streamlined process that is quicker and increases operational efficiency, enhances collaboration, simplifies product quality review process and enables a user to take informed product quality decisions. There is also a need for automated creation of text summaries and data visualizations that avoids redundancy in data and identifies and resolves product quality issues at a quicker pace. The automated creation of text summaries and data visualizations creates the possibility of generating interim reports by an enterprise that would therefore serve as an initiative for continuous improvement.

There is yet another need for automated creation of text summaries and data visualizations for annual product quality reports that can utilize the power of prompt engineering and that can further simplify product quality report review process and help the enterprises take informed product quality decisions and aid business intelligence.

SUMMARY

The present disclosure provides methods for automatic generation of text summaries and data visualizations for annual product quality reports (APQR) of an enterprise. In an embodiment, to automatically generate text summary and data visualizations for an APQR, one or more indexes are provided corresponding to one or more categories of data stored in a database. An input query is received from one or more users via a user interface of a virtual assistant, wherein the query is a text and is based on at least one of the indexes of the one or more categories of data.

Natural language processing techniques are applied to extract one or more relevant textual content from the input query. The database is then queried for retrieving the one or more indexes of the identified relevant textual content. The relevant textual content comprises at least one or more textual content of the past APQR and the one or more indexes of the data corresponds to enterprise index, product index, chapter index, section or sub section index etc.

One or more few shot prompts are provided for generating an output in a predetermined format based on the received input query. The one or more few shot prompts and the retrieved one or more indexes are input to a large language model (LLM) for generating a text summary based on the input data and the generated text summary is rendered at a user device. The LLM is configured to generate the text summary substantially similar to the format and content of past APQR text summaries.

The few shot prompts comprises at least one or more queries received from the one or more users for the past APQR and at least one or more text summaries of the past APQR. The few shot prompts and the indexes of the retrieved relevant data is fed as an input to the LLM for generation of text summaries looking substantially similar to the previous years' annual product quality reports.

Further, in order to generate the data visualizations for the APQR, the database is queried for retrieving one or more indexes representing one or more queries corresponding to queries input by plurality of users for the past APQR. One or more few shot prompts are provided for generating an output in a predetermined format based on the received query. Data visualizations are generated by a business intelligence service based on the retrieved one or more indexes and the one or more few shot prompts and the generated one or more data visualizations are rendered at a user device.

The text summaries and data visualizations generated by the LLM are configured to be copied by the user via a user interface for creation of an executive summary of the current annual product quality report.

In an embodiment, a system for generating text summary for APQR of an enterprise, comprises a processor, a memory storing program instructions which, when executed by the processor, causes the processor to provide one or more indexes corresponding to one or more categories of data stored in a database, receive a query from one or more users, wherein the query is a text and based on the at least one of the indexes of the one or more categories data. The one or more relevant textual content is extracted from the query using natural language processing and the database is queried for retrieving the one or more indexes of the relevant textual content. Further, one or more few shot prompts are provided for generating an output in a predetermined format based on the query received from the one or more users and the one or more few shot prompts and the retrieved one or more indexes are inputted to a large language model (LLM) to generate, a text summary based on the input to the LLM and to render the generated text summary at the user device.

In an embodiment of the present disclosure, the processor is further configured to query the database for retrieving one or more indexes representing one or more queries, wherein the one or more queries correspond to queries input by a plurality of users for the past APQR. The one or more few shot prompts are provided for generating an output in a predetermined format based on the query received from the one or more users. The business intelligence service generates, one or more data visualizations based on the retrieved one or more indexes and the one or more few shot prompts and renders the one or more data visualizations at the user device.

In an embodiment, a non-transitory computer-readable storage medium storing program instructions for generating text summary for annual product quality reports (APQR) of an enterprise, the instructions, when executed, perform the steps of providing one or more indexes corresponding to one or more categories of data stored in a database, receiving a query from the one or more users, wherein the query is a text and based on at least one of the indexes of the one or more categories of data, extracting one or more relevant textual content from the query using natural language processing, querying the database for retrieving the one or more indexes of the relevant textual content, providing one or more few shot prompts for generating an output in a predetermined format based on the query received from the one or more users, inputting, the one or more few shot prompts and the retrieved one or more indexes to a large language model (LLM), generating, a text summary based on the input to the LLM and rendering the text summary at the user device.

In an embodiment, the non-transitory computer-readable storage medium further comprises program instructions to perform the steps of querying the database for retrieving the one or more indexes representing one or more queries, wherein the one or more queries correspond to queries input by a plurality of users for the past APQR, providing one or more few shot prompts for generating an output in a predetermined format based on the query received from the one or more users, generating, by a business intelligence service one or more data visualizations based on the retrieving of one or more indexes and the one or more few shot prompts and rendering the one or more data visualizations at the user device.

BRIEF DESCRIPTION OF THE DRAWINGS

FIGS. 8 through 11B illustrates examples of relevant data fed along with prompts to the LLM for generation of text summaries and relevant text data for data visualizations in accordance with an embodiment of the present disclosure.

FIG. 12 depicts an example of the user interface of the virtual assistant for generating text summary in accordance with an embodiment of the present disclosure.

FIG. 13 illustrates a method for generation of text summary for annual product quality reports (APQR) of an enterprise, in accordance with an embodiment of the present disclosure.

DETAILED DESCRIPTION OF THE INVENTION

Figure 1:
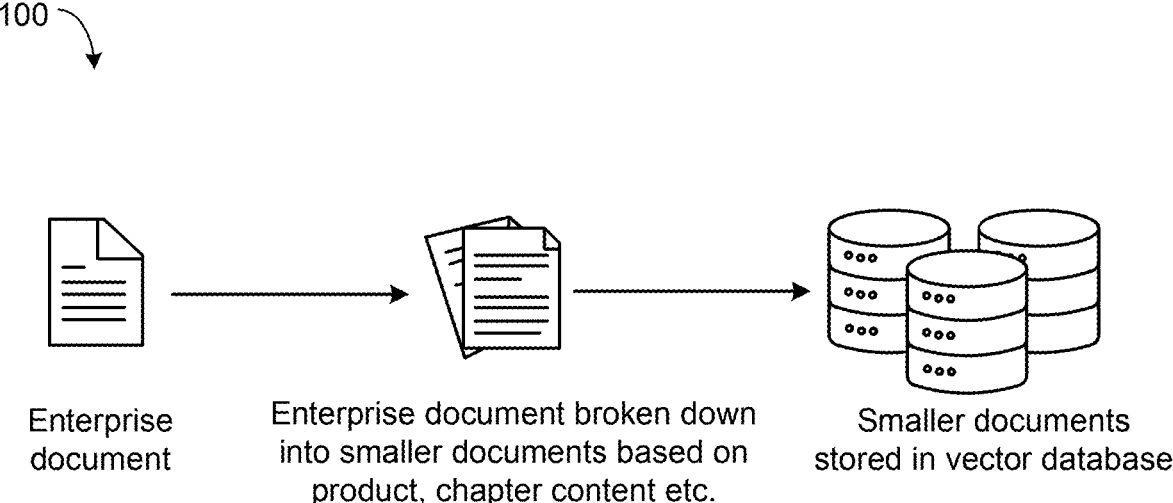
FIG. 1 depicts a representation of enterprise document stored as vectors in vector databases for creation of a vector store in accordance with an embodiment of the present disclosure.

The detailed description set forth below in connection with the appended drawings is intended as a description of various embodiments of the present invention and is not intended to represent the only embodiments in which the present invention may be practiced. Each embodiment described in this invention is provided merely as an example or illustration of the present invention, and should not necessarily be construed as preferred or advantageous over other embodiments. The detailed description includes specific details for the purpose of providing a thorough understanding of the present invention. However, it will be apparent to those skilled in the art that the present invention may be practiced without these specific details.

Some embodiments of the present disclosure now will be described more fully hereinafter with reference to the accompanying drawings, in which some, but not all, embodiments of the disclosure are shown. Indeed, embodiments of the disclosure may be embodied in many different forms and should not be construed as limited to the embodiments set forth herein, rather, these embodiments are provided so that this disclosure will satisfy applicable legal requirements. Like numbers refer to like elements throughout.

As used herein, the term "comprising" means including but not limited to and should be interpreted in the manner it is typically used in the patent context. Use of broader terms such as comprises, includes, and having should be understood to provide support for narrower terms such as consisting of, consisting essentially of, and comprised substantially of.

The phrases "in one embodiment," "in another embodiment", "according to one embodiment," "in some embodiments," and the like generally mean that the particular feature, structure, or characteristic following the phrase may be included in at least one embodiment of the present disclosure, and may be included in more than one embodiment of the present disclosure (importantly, such phrases do not necessarily refer to the same embodiment).

The word "example" or "exemplary" is used herein to mean "serving as an example, instance, or illustration." Any implementation described herein as "exemplary" is not necessarily to be construed as preferred or advantageous over other implementations The present disclosure relates to a method and a system for automatic generation of text summaries and data visualizations for Annual Product Quality Reports (APQR) of an enterprise. APQR are significant for enterprises in order to comply with good manufacturing practice regulations and to maintain high quality products and for regulatory compliance. For example, in case of manufacture of pharmaceutical products, APQRs are recorded annually based on the annual data collated by enterprises in order to measure the standard of quality of each pharmaceutical product and to verify the credibility of existing specifications to manufacture the pharmaceutical product. APQR is required for the quality improvement of the pharmaceutical product and helps in minimizing the risks involved in pharmaceutical production.

In an embodiment, the present disclosure provides a system and a method that can provide for a streamlined process that is quicker and increases operational efficiency, enhances collaboration, simplifies product quality review process and enables a user to take informed product quality decisions. There is a need for automated creation of text summaries and data visualizations that avoids redundancy in data and identifies and resolves product quality issues at a quicker pace. The automated creation of text summaries and data visualizations creates the possibility of generating interim reports by an enterprise thereby serving as an initiative for continuous improvement.

The present disclosure thus provides for automated creation of text summaries and data visualizations for annual product quality reports that can utilize the power of prompt engineering and that can further simplify product quality report review process and help the enterprises to take informed product quality decisions.

In an embodiment, APQR consists of large documents segregated by chapters pertaining to different department users. FIG. 1 depicts an example of a large document consisting of annual product data of an enterprise broken down into multiple smaller documents based on for example, the product and content of the chapters. In a non-limiting example, an enterprise document according to an embodiment of the present disclosure, may have data relating to a pharmaceutical product methocarbamol with chapter contents like manufacturing, quality standards, change control and regulatory activities etc. that may be broken down into multiple smaller documents categorized by chapter, section and subsection.

In an embodiment, an enterprise document is broken down into smaller documents with each smaller document consisting of information relevant to the product and chapter content to ensure that the smaller documents with appropriate sizes are configured to be stored as vectors in vector databases. In an embodiment, unstructured data stored in the enterprise document is converted into vector embeddings using an embedding model and the vector embeddings are stored as vectors in the vector databases categorized based on the enterprise id, product id, chapter id, section and sub section id. In an embodiment, the vectors may be preferably stored locally in a in a vector database like open search. The vectors stored in the vector database help in precisely locating the relevant data according to the vector proximity or resemblance in response to an input user query.

Figure 2:
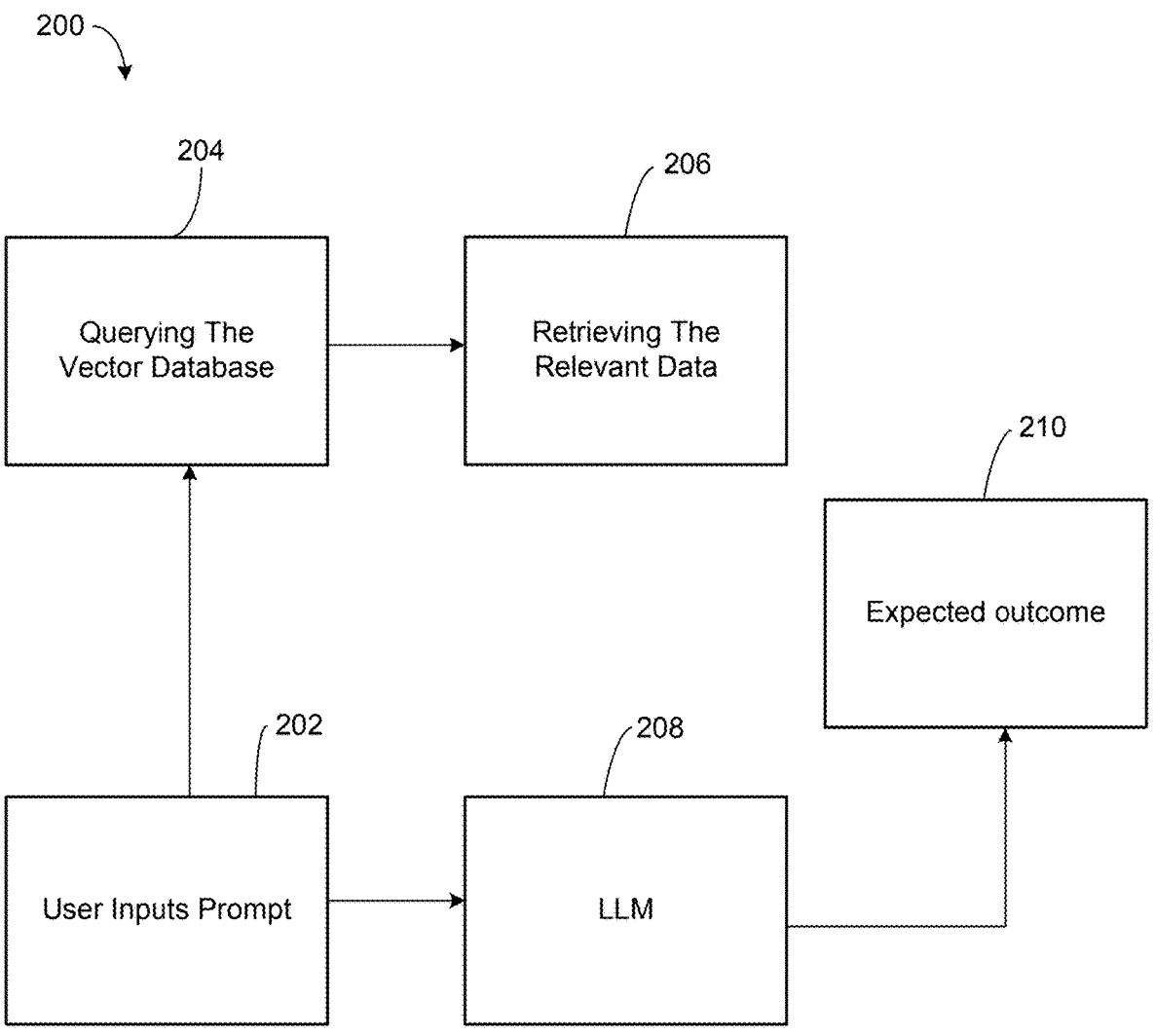
FIG. 2 illustrates a process of executive summary generation based on user prompting and interaction with the Large Language Model (LLM) in accordance with an embodiment of the present disclosure.

FIG. 2 illustrates an example process 200 for generating an executive summary for an APQR of an enterprise based on a input query from a user according to an embodiment of the present disclosure. In an embodiment, at 202, in response to a natural language user input, a user input prompt is generated for querying the vector database. At 204, as the data is represented in the form of vectors (numerical's) in a vector database, on receipt of a user input prompt, frameworks like langchain helps in querying the vector database for retrieving the relevant information from the vector database according to an. As machine learning models or Large Language Models (LLM) cannot accept raw text data as an input, the documents are converted into vector embeddings that carry the semantic meaning of the object.

In an embodiment, at 206, the vector embeddings of the user input prompts are utilized for querying the vector database to retrieve the relevant vector embeddings based on semantic similarity of the vector embeddings of the user input prompt and the vector embeddings stored in the vector database. In an embodiment, at 208, the vector embeddings of the retrieved relevant data and the user input prompts are fed as an input to the LLM along with the user prompts for generating an expected outcome for the APQR. At 210, the expected outcome generated by the LLM is a text summary for the current APQR looking similar in content and format of the past APQR.

Figure 3A:
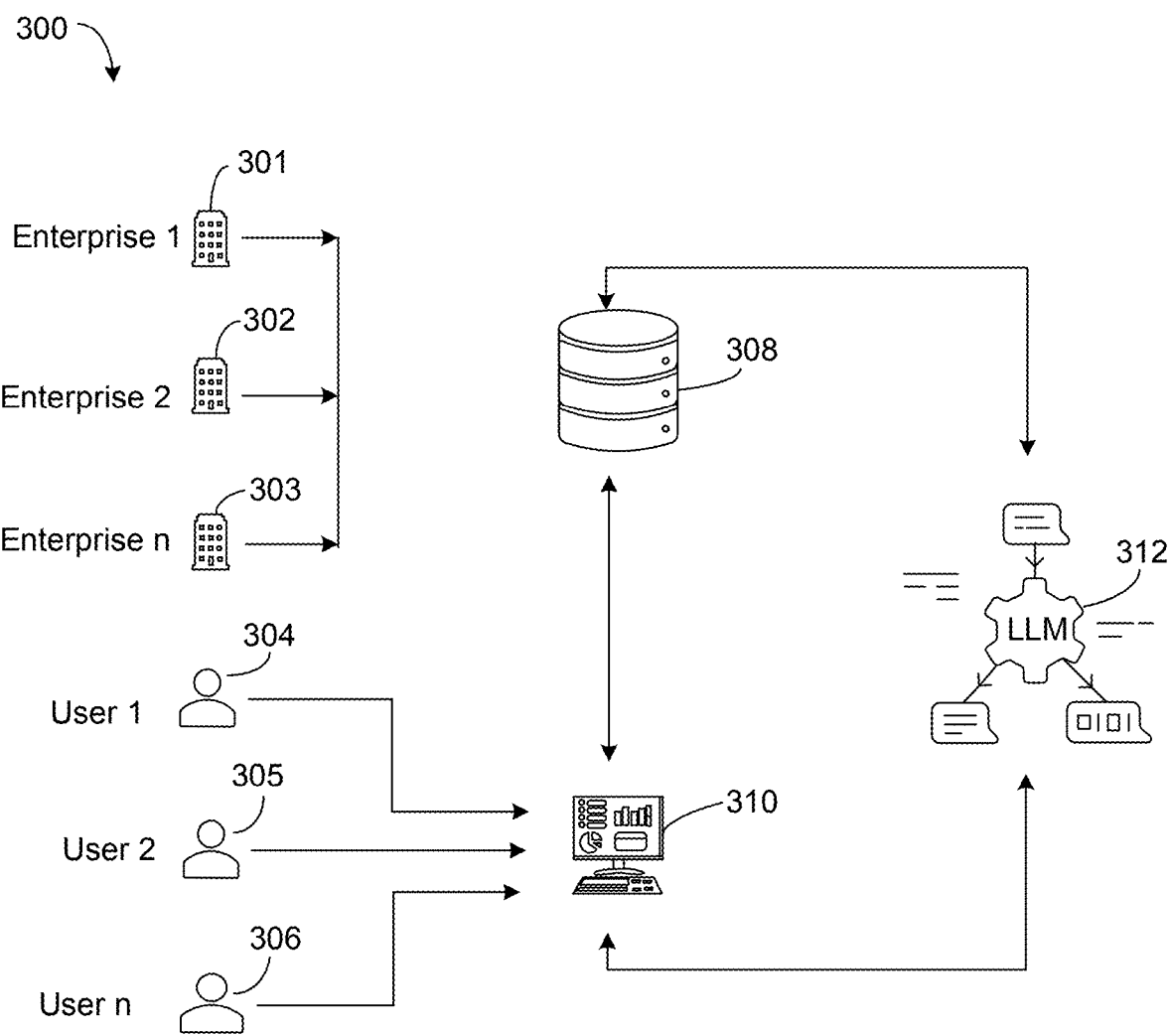
FIG. 3A illustrates an architecture of a system for providing virtual assistance through a user interface, for retrieving relevant information, in accordance with an embodiment of the present disclosure.

FIG. 3A illustrates an exemplary network architecture of the system 300 for providing a virtual assistant for generating an executive summary for APQR in response to a user input prompt, in accordance with an embodiment of the present invention. In an embodiment, there may be one or more entities or enterprises (301 . . . 303) involved in manufacturing and distribution of one or more products and said products may include healthcare related products including medical devices, pharmaceutical products like medicines, therapeutic compositions etc. The said one or more entities (301 . . . 303) are configured to access the database 308 through a network and store one or more information relating to said products in the memory of the database 308. In an embodiment, the database may be a cloud-based database or a localized database. The unstructured data for example, audio, texts, graphs and tables etc., received from the one or more entities are configured to be received by the data base through a network and the said data is stored in the memory of the database 308 in a structured format.

In an embodiment, the database 308 is configured to save the data related to one or more products pertaining to plurality of entities as vector embeddings. The database 308 processes the data by establishing relationship between two or more products and create indexes called vector indexes based on relationship. Vector indexes enhance data retrieval from the database 308 through pointers or references to the data stored in the database. In an embodiment, the enterprises' data are indexed based on the entity, product, chapter, sub chapter etc. for efficient retrieval of the data from the database. The semantic similarity or relatedness of products are established using natural language processing and one or more relationships between various products, entities created based on similarity scores. The database 308 enables for an effective retrieval system based on vector similarities.

In an embodiment, an example vector embedding processed by an embedding model for the pharmaceutical product "Paracetamol" for the year "2024" for batch "1" may be represented as below:

| 0.112 | 0.143 | 0.164 | . . . | 0.225 | 0.246 | 0.276 |
|-------|-------|-------|-------|-------|-------|-------|

On receipt of a user input prompt, a semantic or similarity search is conducted to retrieve relevant vector embeddings from the database. In an embodiment, the users 304 . . . 306 access the database 308 through a user interface 310. The user interface 104 is configured to receive the user's query, process the query to identify the semantics of the terms and phrases according to an embodiment of the present disclosure. The user interface 310 is further configured to display to the user, generated executive summary based on the retrieved relevant vector embeddings and one or more few shot input prompts fed to the LLM 312 according to an embodiment of the present disclosure.

In an embodiment, the system also provides a machine learning model, LLM 312 responsible for generation of executive summaries. The LLM 312 is configured to process the natural language content and/or inputs in response to the input query. The generated output reflects similar natural language content and/or other content similar in response to the input query. In an embodiment, few-shot prompting is used as a technique to enable in-context learning where the demonstrations may be provided in the prompt to guide the model for better performance. In another embodiment, each user is configured to be provided with one or more LLM options, to enable the user to choose a desired output generated by the one or more LLM. In an embodiment, the LLM for generating the executive summaries may be either one of LLAMA2, MISTRAL, FALCON etc. A more detailed embodiment of the system according to the present disclosure is explained in FIGS. 4 through 6.

In an embodiment, an entity (301 . . . 303) may be a business entity, an organization, a data warehouse, or any separate, standalone entities. Further, each user is associated with a user device and the user devices may refer to, for example, one or more computers, computing entities, desktop computers, mobile phones, tablets, phablets, notebooks, laptops, distributed systems, servers, or the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein.

Figure 3B:
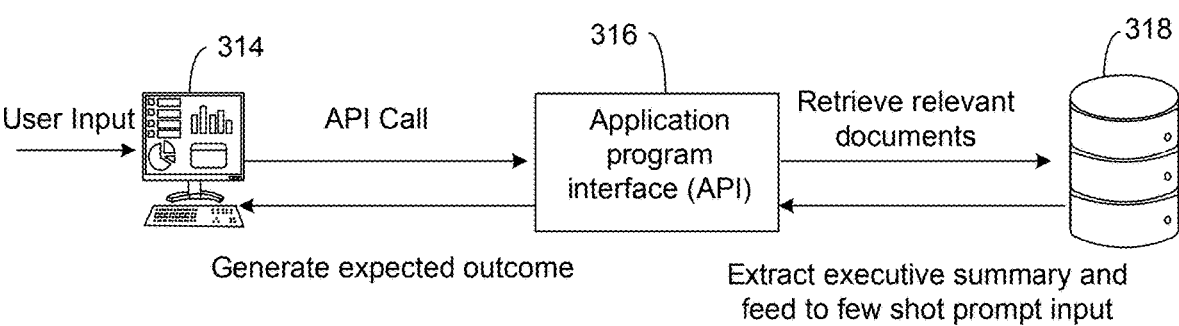
FIG. 3B illustrates an architecture of a system and process for generating few shot prompts for generating an executive summary in accordance with an embodiment of the present disclosure.

FIG. 3B illustrates an architecture of a system and process for generating few shot prompts for generating an executive summary in accordance with an embodiment of the present disclosure. A user inputs a natural language query via a user interface 314, requesting the virtual assistant application to generate an executive summary for the APQR. In an embodiment, on receiving an input query from a user, a call is made to the Application program interface API, 316 to retrieve the relevant documents from the vector database 318. The vector embeddings of the relevant documents are retrieved based on the semantic similarity between the received input query and the documents stored in the vector database 318.

In response to an API call, the vector database performs similarity searches to find and retrieve the vectors most similar to the query, for delivering relevant results to the user. This process allows for the quick and precise handling of a wide range of data types in applications that demand fast search and retrieval capabilities. Particularly for text summarization application as described in the present disclosure, upon receiving an input query from a user, the vector database performs similarly search to filter the documents corresponding to documents for the past 'n' years. The API receives the relevant documents for 'n' years and further filters the documents corresponding to the enterprise and the product for which the current annual product quality report is being prepared. The executive summary from the filtered documents corresponding to the enterprise and product are fed as an input along with prompts to generate sample few shot prompts according to an embodiment of the present disclosure.

Few-shot prompts are input examples provided to a language model, LLM typically consisting of a small number of text samples, each with an associated desired output. These prompts serve as guidance for the model, allowing it to generate text that aligns with the patterns established by the examples.

In the context of natural language processing and text generation, few-shot prompts are a way to fine-tune or customize the behavior of a language model without requiring extensive retraining on specific datasets. Instead of training the model from scratch on a large corpus of data for a particular task, few-shot prompts enable the model to adapt quickly to new tasks or domains by providing just a few examples according to an embodiment of the present disclosure.

In an embodiment, few shot prompts are example inputs provided fed to a LLM for generating an expected and desired output. Few shot prompts consist of text samples and textual descriptions of data visualizations, each associated with a desired output. The said prompts serve as a guidance for the LLM to generate text similar to the texts established in the example inputs. Usage of improper or irrelevant prompts can result in an inaccurate response being provided to the user, and hence leads to an inaccurate generation of executive summary. Thus, usage of relevant prompts and correctly prompt engineering the relevant data to the LLM is key for generating a similar looking and relevant executive summary for an APQR.

In an embodiment, the few shot prompts are generated automatically, for generating a desired outcome in response to the user input. Let us take example of two hypothetical pharmaceutical drugs: "Heart Care" and "Brain Boost". Each has its unique characteristics, manufacturing processes, clinical trials, and thus have distinct quality report summaries. The executive summary extracted by the API from the database for feeding to the few-shot prompts for the pharmaceutical drugs "Heart Care" and "Brain Boost" can take the following form according to an embodiment of the present disclosure.

Quality Report Summary for Heart Care
    "Product Name: Heart Care
    Category: Cardiovascular Drug
    Manufacturing Process: HeartCare is synthesized through
        a patented chemical reaction involving compounds A,
        B, and C, followed by a purification process using
        advanced chromatography.
Clinical Trials:
    Phase 1: Tested on 500 participants. Results showed 98%
        had no adverse side effects.
    Phase 2: Demonstrated a 70% reduction in the risk of
        heart attacks among high-risk patients.
    Phase 3: In a study with 10,000 participants, HeartCare
        not only reduced heart attack risks but also lowered
        blood pressure in 80% of the participants.
    Adverse Effects: Less than 1% reported mild nausea.
        0.1% reported dizziness.

Quality Control:

Each batch is tested for purity and consistency.

Third-party labs confirmed the drug's composition and efficacy.

Passed all regulations as per the National Drug Regulatory Authority".

Quality Report Summary for BrainBoost

"Product Name: BrainBoost

Category: Nootropic Drug

Manufacturing Process: BrainBoost capsules are derived from natural extracts of herbs X, Y, and Z. The extraction process retains essential phytonutrients beneficial for cognitive functions.

Clinical Trials:

Phase 1: 400 participants showed enhanced short-term memory and focus.

Phase 2: On prolonged use, 65% of the participants reported improved cognitive functions and alertness.

Phase 3: In a diverse group of 7,000 participants, Brain-Boost not only enhanced cognitive functions but also showed potential in delaying the onset of Alzheimer's in predisposed individuals.

Adverse Effects: 1.5% reported difficulty in sleeping if taken late in the day. 0.5% reported heightened sensitivity to light.

Quality Control:

Ensured that natural extracts retain their potency through the extraction process.

Each batch undergoes rigorous testing for heavy metals and toxins.

Certified organic and non-GMO".

As evident from the above extracted summaries, the quality report of each drug is tailored to its unique characteristics, manufacturing processes, trial results, and potential side effects. They cater to their specific target groups, uses, and concerns. While "Heart Care" is more focused on cardiovascular benefits and related trials, "Brain Boost" emphasizes cognitive enhancements and its natural origin. In an embodiment, the aforesaid summaries are extracted from various product types from years in the past and are used as examples for few shot learnings.

Figure 4:
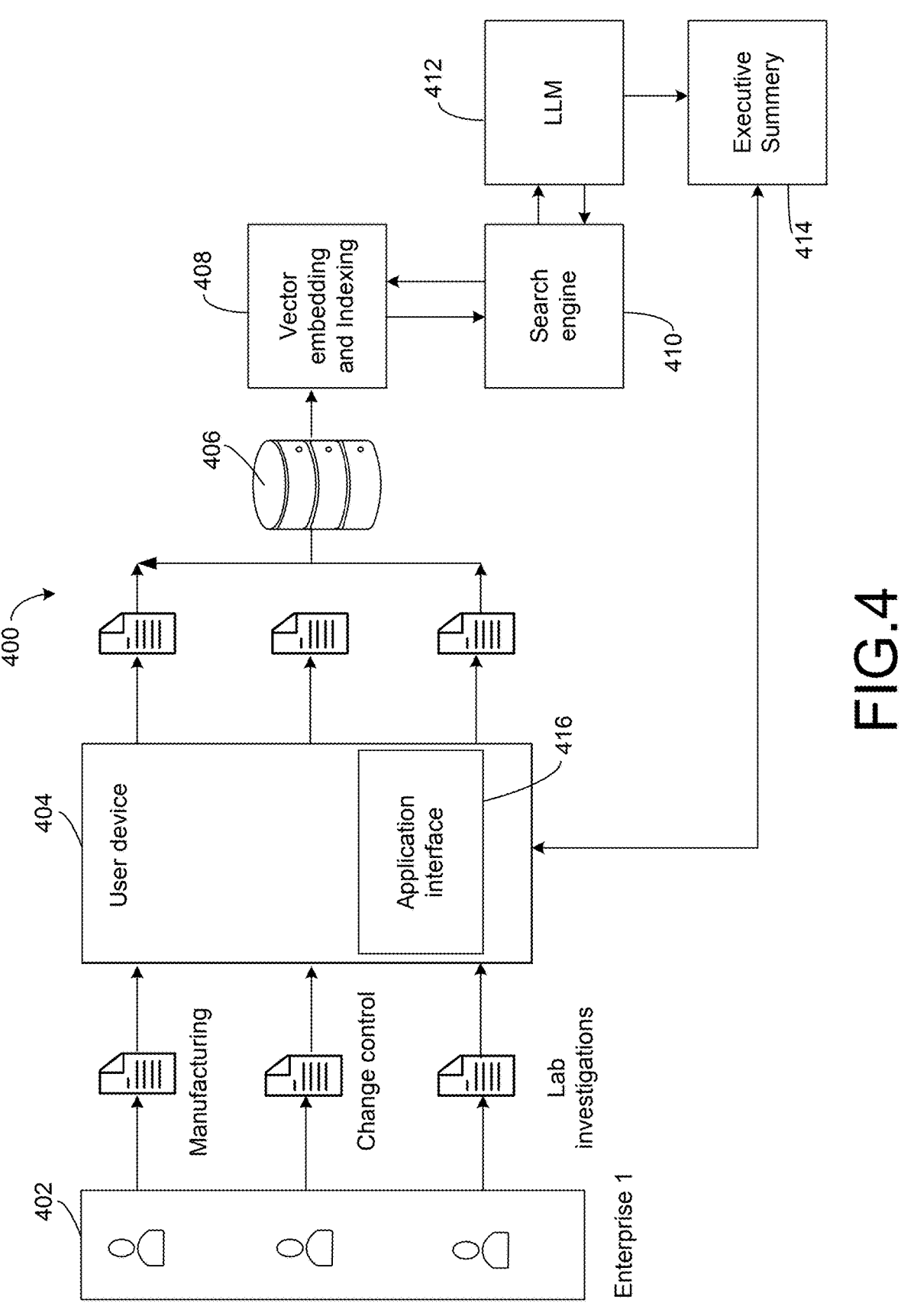
FIG. 4 illustrates an architecture of a system for providing interaction of multiple users from different departments, for retrieving relevant information and for generation of text summary in accordance with an embodiment of the present disclosure.

FIG. 4 illustrates a system 400 for storing data in a vector database 406 through vector embedding and indexing to generate an executive summary for an APQR according to an embodiment of the present disclosure. In an embodiment, FIG. 4 details how unstructured data from one or more departments of an enterprise are structured in a vector database for efficient retrieval of relevant data for the purpose of generating an executive summary for an APQR. An example enterprise may comprise one or more documents consisting of unstructured data from various departments like manufacturing, change control, lab investigations, regulatory etc. In an embodiment, the large documents consisting of unstructured data from various departments may be divided into smaller chunks and are fed to the vector database 406 via an application interface 416 of a user device 404. The smaller chunks of unstructured data requires them to be categorized based on the department, product, chapter content etc. in order to ensure that the relevant data is retrieved in response to an user input according to an embodiment of the present disclosure.

In view of the large amount of data, it is difficult to manage and retrieve relevant data. Vector indexing is a technique for organizing vector embeddings i.e. numerical representations of data (Text, images etc.) to ensure that the vectors are arranged in a searchable and efficient manner to optimize the retrieval process. This arrangement ensures that similar vectors are grouped together. Vector indexing allows for accurate and quicker similarity searches, particularly for documents of larger sizes.

In an embodiment, all possible combinations of index hierarchies may be allowed. For example, a user may chose to have no indexing and have all their enterprise documents under their allocated tenant index, or a customer may have a flat list of hierarchies, based on either products or departments or chapter Types etc. There may also be more than one layer of hierarchies, which means that under Products, we may chose to classify and departments and under departments, we may chose to have further level of chapter types. The aforesaid levels are be achieved by making a call to retrieve embeddings from a vector store like OpenSearch using filtered queries.

In an embodiment, during a configuration phase, the one or more sample few shot prompts (with questions and answers) corresponding to an enterprise and a product, organized by vector indexes with embeddings are stored in the database for future implementation. In an embodiment, in a run-time phase, i.e. when a user inputs a query regarding a particular product via an application interface of a user device, a similarity search is performed by a search engine to see if a match is found at the database. A few shot prompt is constructed if the database returns a match with the user input. The vector embeddings of the relevant document is the retrieved using an open search service and the constructed prompts together with the document vector embeddings are fed to the LLM to generate an executive summary with a similar content and format as an expected response to the user device according to an embodiment of the present disclosure.

Figure 5:
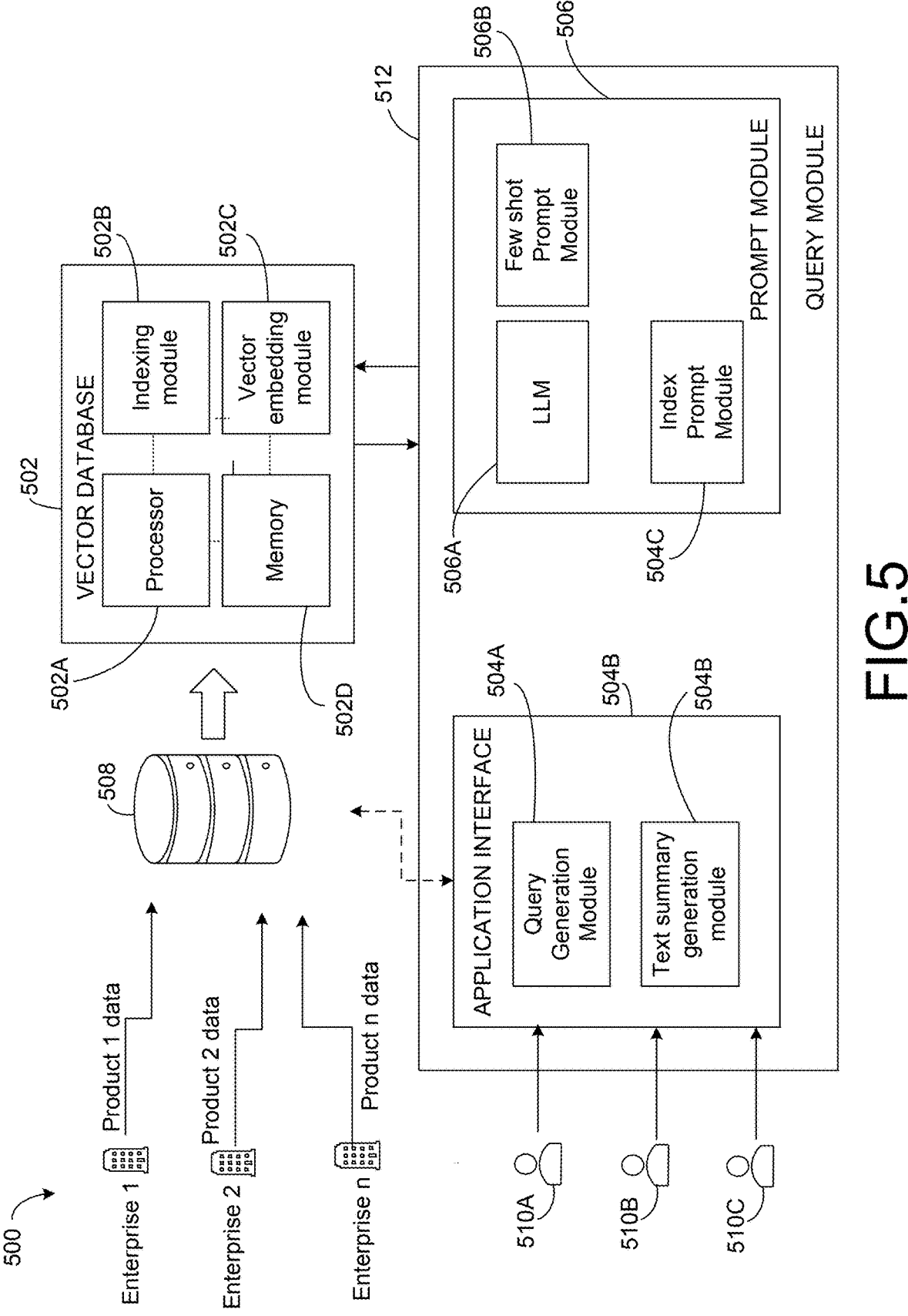
FIG. 5 illustrates a block diagram of a device for generation of text summaries in accordance with an embodiment of the present disclosure.

FIG. 5 illustrates an exemplary module-based architecture 500 for providing a virtual assistant for retrieving data from a database 508 according to an embodiment of the present disclosure. One or more entities (enterprise 1 . . . enterprise n) are involved in manufacturing and distribution of one or products (product 1, product 2 . . . product n), the products may include healthcare related products including medical devices, medicines, therapeutic compositions etc. In an embodiment, the entities are configured to access the database 508 via a network and store one or more information relating to said products in the memory of the database 508. In an embodiment, the database is a cloud-based database.

In another embodiment, the database may be a localized database. The database 508 is configured to save the data obtained from one or more entities and save the data in a structured manner as previously detailed in FIG. 4. In an embodiment according to the present disclosure, the database 508 is represented in the form of a vector database 502. The vector database 502 is configured to save the data related to one or more products pertaining to plurality of entities based on vector indexes and embeddings. In an embodiment, the vector database 502 processes the data by establishing relationship between two or more products and create indexes based on relationship. Further, semantic similarity or relatedness of products are established using natural language processing and one or more relationships between various products, entities are created based on similarity scores.

In an embodiment, the vector database 502 can be discrete to the database 508. In another embodiment, the vector database 502 and the database 508 are integrated to save the data received from the entities in vector-based structure for easy access and retrieval. Vector databases are storage systems specialized in storing large amounts of vectors, and providing efficient search over the vectors. Vector databases include OpenSearch, Milvus, Weaviate, and Qdrant according to an embodiment of the present disclosure. These databases implement various strategies for indexing input vectors and efficient vector search. They also take care of other properties for using vector search in production, e.g., scalability and auto-tuning.

In an embodiment, one or more users 510*a* . . . 510*c* are desirous of accessing data stored in the database 508 to obtain relevant results based on their search query. The user 510*a*-510*c* access the database 508 through a query module 512. The query module 512 according to the present disclosure comprises an application interface 504 and a prompt module 506. In an embodiment, the application interface 504 further comprises a query generation module 504*a* and a text summary generation module 504*b*. Further, the prompt module 506 comprises a machine learning model, LLM 506*a*, few shot prompt module 506*b* and Index prompt module 506*c* according to an embodiment of the present disclosure. The application interface 504 and the prompt module 506 are coupled to each other for processing of the user's query and provides indexing prompt and few-shot prompt to the user, which is further explained below.

The query generation module is configured to receive the user's query. The user's query in an embodiment may be related to one or more products saved in the database, 206. The user's query may be a simple text-based query which is processed by the natural language processing technique to identify the key terms and relationships between one or more words included in the search query. In an embodiment, a machine learning model, LLM is provided which is configured to process the user's query to generate vector index and vector embeddings.

In an embodiment, the user's input query through the application interface 504 may be based on index prompt and few-shot prompt. The index prompt module 506*c* is configured to provide the user one or more index-based searching capabilities. In an embodiment, the few shot prompt module 506*b* is further configured to construct and provide one or more few shot prompts to the machine learning model, LLM 506*a* for generating an expected outcome.

In an embodiment, the user's input query is forwarded to the database 508 for retrieving the relevant results based on semantic vector similarity between the query and information stored in the database. One or more search results are retrieved based on semantic similarity or vector similarity between the user's query and data stored in the vector database. In an embodiment, the vector embeddings of the search query are compared with the vector embeddings of the data stored in the database and based on similarly score, relevant data is retrieved. In an example, a similarity score may be assigned and the data is retrieved based on matching vector embeddings if the similarity score is above a threshold level according to an embodiment of the present disclosure. The system is further configured to change the threshold on the similar score if the retrieved results are not matching the quality score according to another embodiment of the present disclosure.

In another embodiment, the database may be configured to provide results based on standard queries. In an example, one or more predetermined search results may be configured to be generated based on specific prompt. Providing predetermined results based on standard prompts saves the resources in comparing semantic similarity, thereby making the search system efficient according to an embodiment of the present disclosure.

The retrieved result is presented to the text summary generation module. In one embodiment, the result is displayed according to one or more sample few shot prompts generated by the few shot prompt module based on the extracted executive summaries of 'n' years of the past APQR. Further, in another embodiment, the report generation module provides for downloading of reports in a printable format and the generated outcome is configured to be copied for generation of an executive summary.

Figure 6:
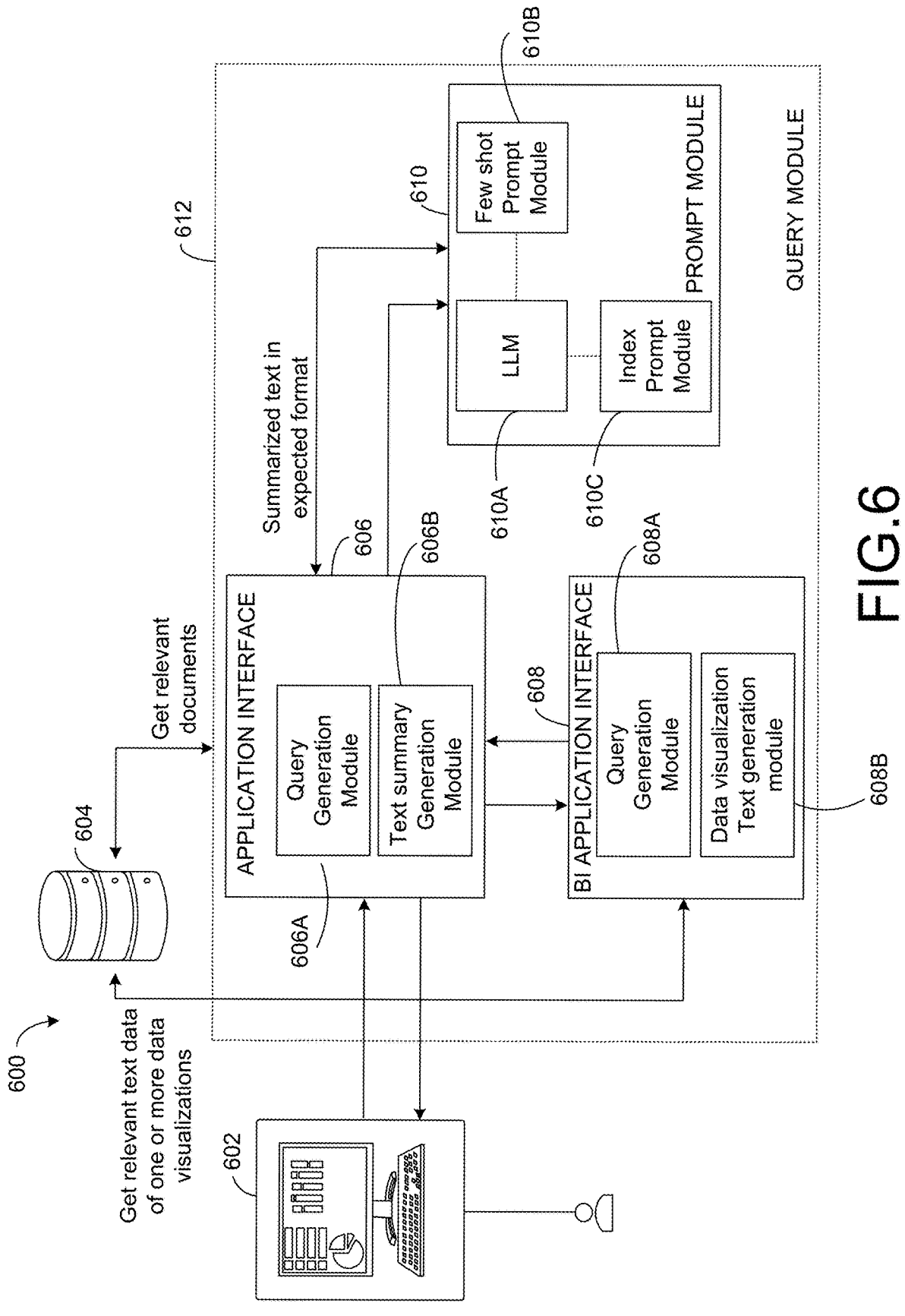
FIG. 6 illustrates a block diagram of a device for generation of text summaries and data visualizations in accordance with an embodiment of the present disclosure.

FIG. 6 illustrates an exemplary module-based architecture 600 for providing a virtual assistant for retrieving data from a database 604 and for generating executive summary including relevant text data for one or more data visualizations of an APQR according to n embodiment of the present disclosure. In an embodiment, one or more entities are involved in manufacturing and distribution of one or products, the products may include healthcare related products including medical devices, medicines, therapeutic compositions etc. In an embodiment, the entities are configured to access the database via a network and store one or more information relating to said products in the memory of the database. In an embodiment, the database may be a cloud-based database. In another embodiment, the database may also be a localized database.

The database is configured to save the data obtained from one or more entities and save the data in a structured manner. In an embodiment according to the present disclosure, the database is represented in the form of a vector database. The vector database is configured to save the data related to one or more products pertaining to plurality of entities based on vector indexes and embeddings. The data stored in the vector database includes text data and one or more data visualizations like bar charts, pie charts, tables, line diagrams etc. In an embodiment, the vector database 604 processes the data by establishing relationship between two or more products and create indexes based on relationship. Further, semantic similarity or relatedness of products are established using natural language processing and one or more relationships between various products, entities are created based on similarity scores.

In an embodiment, the vector database can be discrete to the database. In another embodiment, the vector database and the database are integrated to save the data received from the entities in vector-based structure for easy access and retrieval. Vector databases are storage systems specialized in storing large amounts of vectors, and providing efficient search over the vectors. These databases implement various strategies for indexing input vectors and efficient vector search. They also take care of other properties for using vector search in production, e.g., scalability and auto-tuning.

In an embodiment, one or more users are desirous of accessing data stored in the database 604 to obtain relevant results based on their search query. In an embodiment, the user accesses the database through a query module 612. The query module 612 according to the present disclosure comprises an application interface 606, business intelligence (BI) application interface 608 and a prompt module 610 according to an embodiment of the present disclosure. In an embodiment, the application interface further comprises a query generation module 606*a* and a text summary generation module 606*b*. The BI application interface 608 comprises a query generation module 608*a* and a data visualization text generation module 608*b* according to an embodiment of the present disclosure. Further, the prompt module 610 comprises a machine learning model, LLM, few shot prompt module and Index prompt module. In an embodiment, the application interface 606, the BI application interface 608 and the prompt module 610 are coupled to each other for processing of the user's query and provides indexing prompt and few-shot prompt to the user, which is further explained below.

In an embodiment, the query generation modules (606a, 608a) of the application interface and the BI application interface are configured to receive the user's input query. The user's query in an embodiment may be related to one or more products saved in the database. The user's query may be a simple text-based query which is processed by the natural language processing technique to identify the key terms and relationships between one or more words included in the search query. In an embodiment, a machine learning model, LLM 610a is provided which is configured to process the user's query to generate vector index and vector embeddings.

In an embodiment, the user's input query through the application interface and the BI application interface may be based on index prompt and few-shot prompt. The index prompt module 610c is configured to provide the user one or more index-based searching capabilities. Further, the few shot prompt module is configured to provide one or more few shot prompts to the machine learning model, LLM for generating an expected outcome according to an embodiment of the present disclosure. In an embodiment, the few shot prompts provided as an input to the LLM includes the executive summary and the one or more text data relevant for the one or more data visualizations.

The user's input query is forwarded to the database 604 for retrieving the relevant context or the relevant documents based on semantic vector similarity between the query and information stored in the database according to an embodiment of the present disclosure. One or more search results are retrieved based on semantic similarity or vector similarity between the user's query and data stored in the vector database. In an embodiment, the vector embeddings of the search query are compared with the vector embeddings of the data stored in the database and based on similarly score, relevant data is retrieved. In an example, a similarity score may be assigned and the data is retrieved based on matching vector embeddings if the similarity score is above a threshold level according to an embodiment of the present disclosure an embodiment of the present disclosure. The system is further configured to change the threshold on the similar score if the retrieved results are not matching the quality score according to another embodiment of the present disclosure.

In another embodiment, the database may be configured to provide results based on standard queries. In an example, one or more predetermined search results may be configured to be generated based on specific prompt. Providing predetermined results based on standard prompts saves the resources in comparing semantic similarity, thereby making the search system efficient according to an embodiment of the present disclosure.

In an embodiment, the retrieved result is presented to the text summary generation module 606b and the data visualization text generation module 608b. In an embodiment, the result is displayed according to one or more sample few shot prompts generated by the few shot prompt module based on the extracted executive summaries and the text content of the one or more data visualizations of past 'n' years APQR.

In an embodiment, Business Intelligence services like Amazon Web Services (AWS), Microsoft Azure, IBM cloud, RackSpace etc., are integrated with the user interface for generating one or more data visualizations for generating an expected outcome. The user can call the BI service to create one or more data visualizations looking similar in content and format with respect to the one or more data visualizations of the past 'n' years APQR according to an embodiment of the present disclosure. Further, in another embodiment, the text summary generation module provides for downloading of reports in a printable format and the generated outcome is configured to be copied for generation of an executive summary. The data visualizations generated by the data visualization generation module provides for downloading of reports in a printable format and the generated outcome is configured to be copied for generation of executive summary according to an embodiment of the present disclosure.

Figure 7:
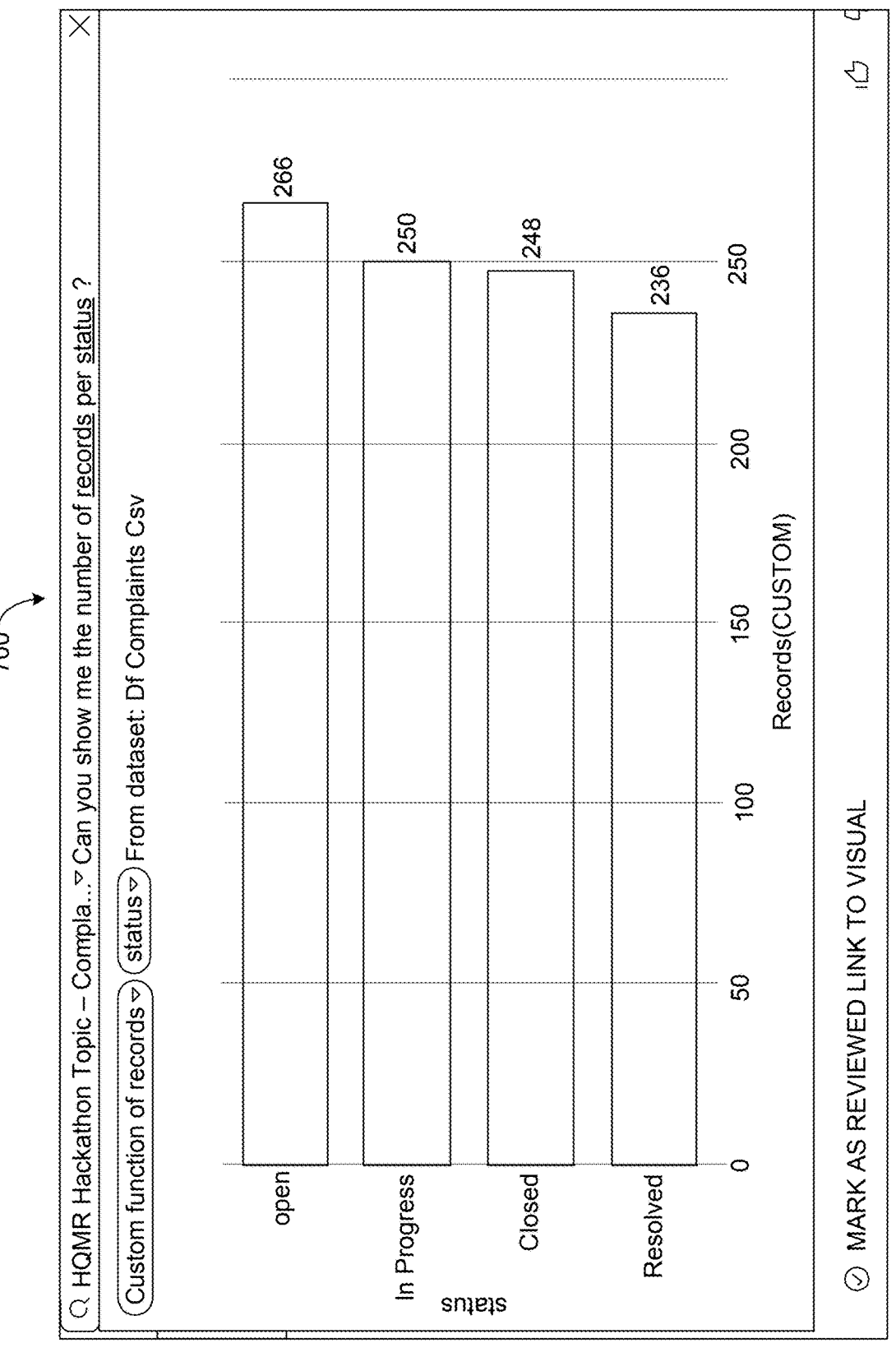
FIG. 7 illustrates an example process for automatic generation of questions that are required to be queried to the BI service for generating relevant text data and one or more data visualizations in accordance with an embodiment of the present disclosure.

FIG. 7 illustrates an example process for automatic generation of questions that are required to be queried to the BI service for generating one or more data visualizations in accordance with an embodiment of the present disclosure. In an embodiment, the database queries of the one or more users of the one or more entities for the last 'n' years relevant for one or more enterprises, products and departments are configured to be defined in the database and are saved as structured data identifiable by vector indexes. When a user selects and defines a data for which a question is to be generated, the user's input query is forwarded to the database for retrieving the relevant data based on semantic vector similarity between the query and information stored in the database for which the user has queried according to an embodiment of the present disclosure.

One or more search results are retrieved based on semantic similarity or vector similarity between the user's query and data stored in the vector database. In an embodiment, the vector embeddings of the search query are compared with the vector embeddings of the data stored in the database and based on similarly score, relevant data is retrieved. In an example, a similarity score may be assigned and the data is retrieved based on matching vector embeddings if the similarity score is above a threshold level according to an embodiment of the present disclosure. The system is further configured to change the threshold on the similar score if the retrieved results are not matching the quality score according to another embodiment of the present disclosure.

In an example as shown in FIG. 7, the user has defined the dataset for which the questions are to be automatically generated for querying the BI application interface of the BI service to generate one or more data visualizations according to an embodiment of the present disclosure. In an embodiment, in response to the user defining the dataset, the BI application service identifies the keywords and the vector indexes for which vector indexes are available at the database. In response to a match between the identified vector indexes and available vector indexes at the database, one or more search results or questions are retrieved based on semantic similarity or vector similarity between the user's query and data stored in the vector database according to an embodiment of the present disclosure. The user in response to the retrieved one or more questions, may chose to select the relevant questions that are required to be inputted to the BI service for generating the one or more data visualizations for the APQR according to an embodiment of the present disclosure. In an embodiment, the generated data visualizations may be downloaded in a printable format and may be copied ad put to use for generating an executive summary with data visualizations.

In another embodiment, the LLM may also be configured to generate the expected questions by passing the data of the relevant product of the past 'n' years APQR along with the one or more few shot prompts to the LLM for generating the expected outcome. The expected outcome is the questions that are required to be inputted to the BI service similar to the questions of the past 'n' years of the APQR for generating one or more data visualizations for use in an executive summary of an APQR according to an embodiment of the present disclosure.

The input required to be passed as prompts to the LLM along with the reports of the previous APQR may take the following form "Can you generate the questions that I need to ask AWS QuickSight BI service using my current report 2023?"
Q1. Show pie chart for records
Q2. Show bar chart for Manufacturing plants
Q3. Show line graph for Change Control?
"Can you generate the questions that I need to ask AWS QuickSight BI service using my current report 2023?"
Q1. Show pie chart for records
Q2. Show bar chart for Manufacturing plants
Q3. Show line graph for CC?
"Can you generate the questions that I need to ask BI service using my current report 2024?"

In an embodiment, the LLM is thus fed with the relevant documents of the past APQR along with the aforesaid few shot prompts to generate an expected outcome i.e. generating questions that a user needs to ask the BI service for generating one or more data visualizations.

FIGS. 8 through 11B illustrates an example data that is stored in the database for generating a text summary and one or more data visualization according to an embodiment of the present disclosure. FIGS. 8 and 9 illustrates tabled data displaying the container and closure system quality report and raw material quality standards respectively for various drugs.

FIG. 10 illustrates data relating to change control activities and FIGS. 11A and 11B illustrates example data visualizations for an APQR reflecting the changed quality standards and past annual product review of an example drug methocarbamol according to an embodiment of the present disclosure. The unstructured data illustrated in FIGS. 9 through 12B are structured and stored as vector indexes in the vector database for efficient search and retrieval of relevant data from the vector database.

FIG. 12 illustrates an example user interface of a virtual assistant for generating executive summary for an APQR according to an embodiment of the present disclosure. The user interface illustrates that an executive summary is automatically generated in response to a user input query for a particular department e.g. "manufacturing". The user interface also displays the reference based on which the executive summary has been generated and further displays the prompt sample based on which the expected outcome has been generated. The generated executive summary is configured to be displayed in such a way that the outcome can be copied and pasted for generating an executive summary for a current year's APQR.

FIG. 13 illustrates method steps for providing virtual assistance for generating an executive summary in accordance with an embodiment of the present disclosure. The method for generating text summary for annual product quality reports (APQR) of an enterprise, comprises at Step 1302, providing one or more indexes corresponding to one or more categories of data stored in a database. The database processes the data by establishing relationship between two or more products and create indexes called vector indexes based on relationship. Vector indexes enhance data retrieval from the database through pointers or references to the data stored in the database. In an embodiment, the enterprise's data are indexed based on the entity, product, chapter, sub chapter etc. for efficient retrieval of the data from the database. The semantic similarity or relatedness of products are established using natural language processing and one or more relationships between various products, entities created based on similarity scores. The database enables for an effective retrieval system based on vector similarities.

At Step 1304, the user interface receives a query from one or more users, wherein the query is a text and is based on the at least one of the indexes of the one or more categories of data according to an embodiment of the present disclosure. The user's query may be a simple text-based query which is processed by the natural language processing technique to identify the key terms and relationships between one or more words included in the search query. A machine learning model, LLM is provided which is configured to process the user's query to generate vector index and vector embeddings according to an embodiment of the present disclosure.

At Step 1306 one or more relevant textual content from the query is extracted using natural language processing. Particularly, in an embodiment, user's input query is forwarded to the database for retrieving the relevant results based on semantic vector similarity between the query and information stored in the database. One or more search results are retrieved based on semantic similarity or vector similarity between the user's query and data stored in the vector database. In an embodiment, the vector embeddings of the search query are compared with the vector embeddings of the data stored in the database and based on similarly score, relevant data is retrieved. In an example, a similarity score may be assigned and the data is retrieved based on matching vector embeddings if the similarity score is above a threshold level according to an embodiment of the present disclosure.

At Step 1308, the database is queried for retrieving the one or more indexes of the relevant textual content. At Step 1310, one or more few shot prompts are provided for generating an output in a predetermined format based on the query received from the one or more users. In an embodiment, the few shot prompts comprises at least one or more queries received from the one or more users for the past APQR and at least one or more text summaries of the past APQR. The few shot prompts and the indexes of the retrieved relevant data is fed as an input to the LLM for generation of text summaries looking substantially similar to the previous years' annual product quality reports.

At Step 1312, the one or more few shot prompts and the retrieved one or more indexes are fed to a large language model (LLM) according to an embodiment of the present disclosure. In an embodiment, few shot prompts consist of text samples and textual descriptions of data visualizations, each associated with a desired output. The said prompts serve as a guidance for the LLM to generate text similar to the texts established in the example inputs. Usage of improper or irrelevant prompts can result in an inaccurate response being provided to the user, and hence leads to an inaccurate generation of executive summary. Thus, usage of relevant prompts and correctly prompt engineering the relevant data to the LLM is key for generating a similar looking and relevant executive summary for an APQR.

In an embodiment, the few shot prompts are generated automatically, for generating a desired outcome in response to the user input. At Step 1314, text summary is generated based on the input to the LLM and at Step 1316, the generated text summary is rendered at a user device.

In an embodiment, the relevant textual content comprises at least one or more textual content of the past APQR. In an embodiment, the indexes of the one or more categories of data corresponds to an enterprise, product, chapter, section or sub-section.

In an embodiment, the LLM is configured to generate the text summary substantially similar to the format and content of past APQR text summaries. In an embodiment, the one or more few shot prompts comprises at least one or more queries received from the one or more users for the past APQR and at least one or more text summaries of the past APQR.

In an embodiment, the one or more queries correspond to queries input by a plurality of users for the past APQR. In an embodiment, one or more few shot prompts are provided for generating an output in a predetermined format based on the query received from the one or more users.

In an embodiment, the business intelligence service generates one or more data visualizations based on the retrieved one or more indexes and the one or more few shot prompts and renders the generated one or more data visualizations at the user device.

In an embodiment, an updated text summary and data visualizations are generated in response to a change in the retrieved one or more indexes of the one or more relevant textual content. The generated text summary and one or more data visualizations are configured to be transmitted to one or more authorities for regulatory compliance.

In an embodiment, a system for generating text summary for APQR of an enterprise, comprises a processor, a memory storing program instructions which, when executed by the processor, causes the processor to provide one or more indexes corresponding to one or more categories of data stored in a database, receive a query from one or more users, wherein the query is a text and based on the at least one of the indexes of the one or more categories data. The one or more relevant textual content is extracted from the query using natural language processing and the database is queried for retrieving the one or more indexes of the relevant textual content. Further, one or more few shot prompts are provided for generating an output in a predetermined format based on the query received from the one or more users and the one or more few shot prompts and the retrieved one or more indexes are inputted to a large language model (LLM) to generate, a text summary based on the input to the LLM and to render the generated text summary at the user device.

In an embodiment of the present disclosure, the processor is further configured to query the database for retrieving one or more indexes representing one or more queries, wherein the one or more queries correspond to queries input by a plurality of users for the past APQR. The one or more few shot prompts are provided for generating an output in a predetermined format based on the query received from the one or more users. A business intelligence service generates, one or more data visualizations based on the retrieved one or more indexes and the one or more few shot prompts and renders the one or more data visualizations at the user device.

The user can call the BI service to create one or more data visualizations looking similar in content and format with respect to the one or more data visualizations of the past 'n' years APQR according to an embodiment of the present disclosure. Further, in another embodiment, the generated reports may be downloaded in a printable format and the generated outcome is configured to be copied for generation of an executive summary. The data visualizations generated may be downloaded in a printable format and is configured to be copied for generation of an executive summary according to an embodiment of the present disclosure.

In an embodiment, a non-transitory computer-readable storage medium storing program instructions for generating text summary for annual product quality reports (APQR) of an enterprise, the instructions, when executed, perform the steps of providing one or more indexes corresponding to one or more categories of data stored in a database, receiving a query from the one or more users, wherein the query is a text and based on at least one of the indexes of the one or more categories of data, extracting one or more relevant textual content from the query using natural language processing, querying the database for retrieving the one or more indexes of the relevant textual content, providing one or more few shot prompts for generating an output in a predetermined format based on the query received from the one or more users, inputting, the one or more few shot prompts and the retrieved one or more indexes to a large language model (LLM), generating, a text summary based on the input to the LLM and rendering the text summary at the user device.

In an embodiment, the non-transitory computer-readable storage medium further comprises program instructions to perform the steps of receiving the query via a user interface of the user device, querying the database for retrieving the one or more indexes representing one or more queries, wherein the one or more queries correspond to queries input by a plurality of users for the past APQR, providing one or more few shot prompts for generating an output in a predetermined format based on the query received from the one or more users, generating, by a business intelligence service one or more data visualizations based on the retrieving of one or more indexes and the one or more few shot prompts and rendering the one or more data visualizations at the user device and transmitting the generated text summary and one or more data visualizations to one or more authorities for regulatory compliance.

In some embodiments, the network may be a public network (e.g., the Internet), a private network (e.g., an internal localized, or closed-off network between particular devices). In some other embodiments, the network may be a hybrid network (e.g., a network enabling internal communications between particular connected devices and external communications with other devices). In various embodiments, the network may include one or more relay(s), router(s), switch(es), routing station(s), and/or the like.

The figures of the disclosure are provided to illustrate some examples of the invention described. The figures are not to limit the scope of the depicted embodiments or the appended claims. Aspects of the disclosure are described herein with reference to the invention to example embodiments for illustration. It should be understood that specific details, relationships, and method are set forth to provide a full understanding of the example embodiments. One of ordinary skill in the art recognize the example embodiments can be practiced without one or more specific details and/or with other methods.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Aspects of the present disclosure may be implemented as computer program products that comprise articles of manufacture. Such computer program products may include one or more software components including, for example, applications, software objects, methods, data structure, and/or the like. In some embodiments, a software component may be stored on one or more non-transitory computer-readable media, which computer program product may comprise the computer-readable media with software component, comprising computer executable instructions, included thereon. The various control and operational systems described herein may incorporate one or more of such computer program products and/or software components for causing the various conveyors and components thereof to operate in accordance with the functionalities described herein.

A software component may be coded in any of a variety of programming languages. An illustrative programming language may be a lower-level programming language such as an assembly language associated with a particular hardware architecture and/or operating system platform/system. Other example of programming languages included, but are not limited to, a macro language, a shell or command language, a job control language, a script language, a database query, or search language, and/or report writing language. In one or more example embodiments, a software component comprising instructions in one of the foregoing examples of programming languages may be executed directly by an operating system or other software component without having to be first transformed into another form. A software component may be stored as a file or other data storage methods. Software components of a similar type or functionally related may be stored together such as, for example, in a particular directory, folder, or repository. Software components may be static (e.g., pre-established, or fixed) or dynamic (e.g., created or modified at the time of execution).

While this specification contains many specific implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

It is to be understood that the disclosure is not to be limited to the specific embodiments disclosed, and that modifications and other embodiments are intended to be included within the scope of the appended claims. Although specific terms are employed herein, they are used in a generic and descriptive sense only and not for purposes of limitation, unless described otherwise.

What is claimed:

1. A method for generating text summary for annual product quality reports (APQR) of an enterprise, comprising:

providing one or more indexes corresponding to one or more categories of data stored in a database;

receiving a query from one or more users, wherein the query is a text and based on the at least one of the indexes of the one or more categories of data;

extracting one or more relevant textual content from the query using natural language processing;

querying the database for retrieving the one or more indexes of the relevant textual content;

providing one or more few shot prompts for generating an output in a predetermined format based on the query received from the one or more users, wherein the one or more few shot prompts comprises at least one or more queries received from the one or more users for the past APQR and at least one or more text summaries of the past APQR;

inputting, the one or more few shot prompts and the retrieved one or more indexes to a large language model (LLM);

generating a text summary based on the input to the LLM; and rendering the generated text summary at a user device.

2. The method of claim 1, wherein the query is received via a user interface of the user device.

3. The method of claim 1, wherein the relevant textual content comprises: at least one or more textual content of the past APQR.

4. The method of claim 1, wherein the indexes of the one or more categories of data corresponds to an enterprise, product, chapter, section or sub-section.

5. The method of claim 1, wherein the LLM is configured to generate the text summary in the format and with content of past APQR text summaries.

6. The method of claim 1, further comprising:

querying the database for retrieving one or more indexes representing one or more queries, wherein the one or more queries correspond to queries input by a plurality of users for the past APQR;

providing the one or more few shot prompts for generating an output in a predetermined format based on the query received from the one or more users;

generating, by a business intelligence service, one or more data visualizations based on the retrieved one or more indexes and the one or more few shot prompts; and rendering the one or more data visualizations at the user device.

7. The method of claim 1, further comprising: generating an updated text summary and data visualizations in response to a change in the retrieved one or more indexes of the one or more relevant textual content.

8. The method of claim 1, wherein the generated text summary and one or more data visualizations are configured to be transmitted to one or more authorities for regulatory compliance.

9. The method of claim 1, further comprising:

providing a vector database storing vector embeddings of past APQR documents; and retrieving, from the vector database, one or more past APQR documents or portions thereof by comparing the vector embeddings of the query and the stored documents, and retrieving relevant data when a similarity score based on vector difference exceeds an adjustable threshold.

10. A system for generating text summary for annual product quality reports (APQR) of an enterprise, comprising:

a processor, a memory storing program instructions which, when executed by the processor, causes the processor to:

provide one or more indexes corresponding to one or more categories of data stored in a database;

receive a query from one or more users, wherein the query is a text and based on the at least one of the indexes of the one or more categories data;

extract one or more relevant textual content from the query using natural language processing;

query the database for retrieving the one or more indexes of the relevant textual content;

provide one or more few shot prompts for generating an output in a predetermined format based on the query received from the one or more users, wherein the one or more few shot prompts comprises at least one or more queries received from the one or more users for the past APQR and at least one or more text summaries of the past APQR;

input, the one or more few shot prompts and the retrieved one or more indexes to a large language model (LLM);

generate, a text summary based on the input to the LLM; and render the generated text summary at the user device.

11. The system of claim 10, wherein the processor is configured to:

query the database for retrieving one or more indexes representing one or more queries, wherein the one or more queries correspond to queries input by a plurality of users for the past APQR;

provide the one or more few shot prompts for generating an output in a predetermined format based on the query received from the one or more users;

generate, by a business intelligence service, one or more data visualizations based on the retrieved one or more indexes and the one or more few shot prompts; and render the one or more data visualizations at the user device.

12. The system of claim 10, wherein the processor is configured to: generate an updated text summary and data visualizations in response to a change in the retrieved one or more indexes of the one or more relevant textual content.

13. The system of claim 10, wherein the processor is configured to: generate the text summary and data visualizations in the format and with content of past APQR text summaries.

14. The system of claim 10, wherein the processor is configured to: transmit the generated text summary and one or more data visualizations to one or more authorities for regulatory compliance.

15. A non-transitory computer-readable storage medium storing program instructions for generating text summary for annual product quality reports (APQR) of an enterprise, the instructions, when executed, perform the steps of:

providing one or more indexes corresponding to one or more categories of data stored in a database;

receiving a query from the one or more users, wherein the query is a text and based on at least one of the indexes of the one or more categories of data;

extracting one or more relevant textual content from the query using natural language processing;

querying the database for retrieving the one or more indexes of the relevant textual content;

providing one or more few shot prompts for generating an output in a predetermined format based on the query received from the one or more users, wherein the one or more few shot prompts comprises at least one or more queries received from the one or more users for the past APQR and at least one or more text summaries of the past APQR;

inputting, the one or more few shot prompts and the retrieved one or more indexes to a large language model (LLM);

generating, a text summary based on the input to the LLM; and rendering the text summary at the user device.

16. The non-transitory computer-readable storage medium of claim 15, further comprising program instructions to perform the steps of: receiving the query via a user interface of the user device.

17. The non-transitory computer-readable storage medium of claim 15, further comprising program instructions to perform the steps of:

querying the database for retrieving the one or more indexes representing one or more queries, wherein the one or more queries correspond to queries input by a plurality of users for the past APQR;

providing one or more few shot prompts for generating an output in a predetermined format based on the query received from the one or more users;

generating, by a business intelligence service one or more data visualizations based on the retrieving of one or more indexes and the one or more few shot prompts; and rendering the one or more data visualizations at the user device.

18. The non-transitory computer-readable storage medium of claim 15, comprising program instructions to perform the steps of: generating an updated text summary and data visualizations in response to a change in the retrieved one or more indexes of the one or more relevant textual content.

19. The non-transitory computer-readable storage medium of claim 15, comprising program instructions to perform the steps of: generating the text summary and data visualizations in the format and with content of past APQR text summaries.

20. The non-transitory computer-readable storage medium of claim 15, comprising program instructions to perform the steps of: transmitting the generated text summary and one or more data visualizations to one or more authorities for regulatory compliance.

* * * * *